(12) United States Patent
Toyoda et al.

(10) Patent No.: US 10,970,537 B2
(45) Date of Patent: Apr. 6, 2021

(54) IMAGE PROCESSING APPARATUS, IMAGE PROCESSING METHOD, AND RECORDING MEDIUM HAVING IMAGE PROCESSING PROGRAM RECORDED THEREIN

(71) Applicant: OLYMPUS CORPORATION, Hachioji (JP)

(72) Inventors: Tetsuya Toyoda, Tokyo (JP); Kazumi Ito, Tokyo (JP); Masayuki Nakatsuka, Tokyo (JP); Tatsuya Kino, Tokyo (JP); Ryuhi Okubo, Asaka (JP); Shigeru Kato, Tokyo (JP); Tetsuya Shirota, Tokyo (JP); Kazuhiko Osa, Tokyo (JP); Osamu Nonaka, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 45 days.

(21) Appl. No.: 16/531,365

(22) Filed: Aug. 5, 2019

(65) Prior Publication Data
US 2020/0050850 A1  Feb. 13, 2020

(30) Foreign Application Priority Data

Aug. 9, 2018 (JP) .............................. JP2018-150231

(51) Int. Cl.
  *G06T 5/00*  (2006.01)
  *G06T 7/80*  (2017.01)
  (Continued)

(52) U.S. Cl.
  CPC ............ *G06K 9/00604* (2013.01); *G06T 3/20* (2013.01); *G06T 5/003* (2013.01); *G06T 7/50* (2017.01); *G06T 7/80* (2017.01); *G06T 19/006* (2013.01)

(58) Field of Classification Search
  CPC ....... G06K 9/00604; G06T 5/003; G06T 7/80; G06T 7/50; G06T 3/20; G06T 19/006;
  (Continued)

(56) References Cited

U.S. PATENT DOCUMENTS

2013/0010084 A1* 1/2013 Hatano ................ H04N 13/106
                                                  348/47
2013/0113895 A1* 5/2013 Misawa ............... H04N 13/204
                                                  348/49

(Continued)

*Primary Examiner* — Edward F Urban
*Assistant Examiner* — Wassim Mahrouka
(74) *Attorney, Agent, or Firm* — Volpe Koenig

(57) ABSTRACT

An image processing apparatus generates a left-eye viewpoint image and a right-eye viewpoint image, detects one or more pairs that are each a pair of a partial image of the left-eye viewpoint image and a partial image of the right-eye viewpoint image that are similar to each other, performs, for each of the one or more pairs, image adjustment processing for adjusting the three-dimensionality of one of or both of the partial images of the left-eye and right-eye viewpoint images, displays the left-eye viewpoint image or the left-eye viewpoint image after the image adjustment processing in a manner such that this image is capable of being observed with a left eye, and displays the right-eye viewpoint image or the right-eye viewpoint image after the image adjustment processing in a manner such that this image is capable of being observed with a right eye.

9 Claims, 12 Drawing Sheets

(51) Int. Cl.
*G06T 3/20* (2006.01)
*G06T 7/50* (2017.01)
*G06T 19/00* (2011.01)
*G06K 9/00* (2006.01)

(58) Field of Classification Search
CPC .. H04N 13/106; H04N 13/204; H04N 13/207; H04N 13/218; H04N 13/128; H04N 13/239; H04N 13/282
See application file for complete search history.

(56) References Cited

U.S. PATENT DOCUMENTS

| | | | |
|---|---|---|---|
| 2013/0162764 A1* | 6/2013 | Masuda | H04N 13/239 348/42 |
| 2014/0015938 A1* | 1/2014 | Sasaki | G03B 35/10 348/47 |
| 2014/0139644 A1* | 5/2014 | Ueda | G03B 35/08 348/49 |
| 2014/0225993 A1* | 8/2014 | Kuroki | H04N 13/239 348/47 |
| 2015/0009299 A1* | 1/2015 | Izawa | H04N 13/282 348/49 |
| 2015/0015677 A1* | 1/2015 | Izawa | H04N 13/207 348/49 |
| 2017/0064226 A1* | 3/2017 | Ishii | H04N 5/36961 |

* cited by examiner

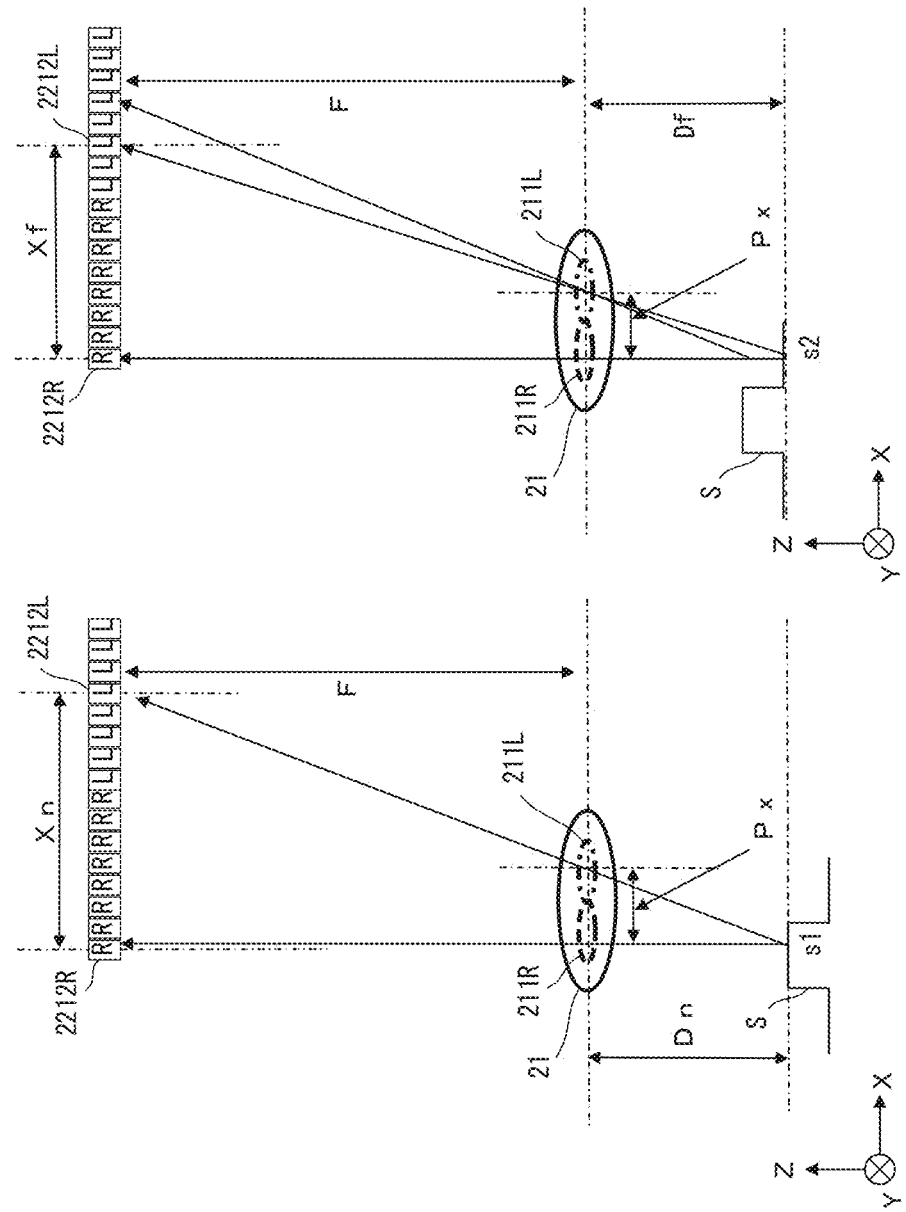

IMAGE PROCESSING APPARATUS, IMAGE PROCESSING METHOD, AND RECORDING MEDIUM HAVING IMAGE PROCESSING PROGRAM RECORDED THEREIN

CROSS-REFERENCE TO RELATED APPLICATIONS

This application is based upon and claims the benefit of priority of the prior Japanese Patent Application No. 2018-150231, filed on Aug. 9, 2018, the entire contents of which are incorporated herein by reference.

FIELD

Embodiments discussed herein are related to an image processing apparatus, an image processing method to be implemented by the image processing apparatus, and a recording medium having recorded therein an image processing program to be executed by the image processing apparatus.

BACKGROUND

Apparatuses capable of displaying images that have a three-dimensional effect have been conventionally known.

Patent document 1 (Japanese Laid-open Patent Publication No. 11-155153) discloses a three-dimensional-image display apparatus that includes a large-diameter optical system that forms two images corresponding to a subject, a first lenticular lens that separates the two images formed by the large-diameter optical system into a first image and a second image, an imaging unit that outputs electric signals corresponding to the first and second images obtained as a result of the separating performed by the first lenticular lens, a signal processing unit that generates a first image signal corresponding to the first image and a second image signal corresponding to the second image by processing the electric signals output from the imaging unit and generates a video signal of one frame by compositing the first and second image signals, a display unit that displays an image corresponding to the one frame by being driven in accordance with the image signal of the one frame output from the signal processing unit, and a second lenticular lens that allows the image to be three-dimensionally displayed by the display unit.

SUMMARY

An aspect of embodiments provides an image processing apparatus that includes a processor and a display apparatus. The processor acquires image information from which a left-eye viewpoint image is capable of being formed and image information from which a right-eye viewpoint image is capable of being formed, so as to generate the left-eye and right-eye viewpoint images, detects one or more pairs that are each a pair of a partial image of the left-eye viewpoint image and a partial image of the right-eye viewpoint image that are similar to each other, and performs, for each of the one or more pairs, image adjustment processing for adjusting the three-dimensionality of one of or both of the partial images of the left-eye and right eye viewpoint images. The display apparatus displays the left-eye viewpoint image or the left-eye viewpoint image after the image adjustment processing in a manner such that this image is capable of being observed with a left eye, and displays the right-eye viewpoint image or the right-eye viewpoint image after the image adjustment processing in a manner such that this image is capable of being observed with a right eye.

Another aspect of embodiments provides an image processing method to be implemented by an image processing apparatus, the image processing method including: acquiring image information from which a left-eye viewpoint image is capable of being formed and image information from which a right-eye viewpoint image is capable of being formed, so as to generate the left-eye and right-eye viewpoint images; detecting one or more pairs that are each a pair of a partial image of the left-eye viewpoint image and a partial image of the right-eye viewpoint image that are similar to each other; performing, for each of the one or more pairs, image adjustment processing for adjusting the three-dimensionality of one of or both of the partial images of the left-eye and right-eye viewpoint images; and displaying the left-eye viewpoint image or the left-eye viewpoint image after the image adjustment processing in a manner such that this image is capable of being observed with a left eye, and displaying the right-eye viewpoint image or the right-eye viewpoint image after the image adjustment processing in a manner such that this image is capable of being observed with a right eye.

Still another aspect of embodiments provides a non-transitory computer-readable recording medium having recorded therein an image processing program for causing a computer of an image processing apparatus to perform a process that includes: acquiring image information from which a left-eye viewpoint image is capable of being formed and image information from which a right-eye viewpoint image is capable of being formed, so as to generate the left-eye and right-eye viewpoint images; detecting one or more pairs that are each a pair of a partial image of the left-eye viewpoint image and a partial image of the right-eye viewpoint image that are similar to each other; performing, for each of the one or more pairs, image adjustment processing for adjusting the three-dimensionality of one of or both of the partial images of the left-eye and right-eye viewpoint images; and displaying the left-eye viewpoint image or the left-eye viewpoint image after the image adjustment processing in a manner such that this image is capable of being observed with a left eye, and displaying the right-eye viewpoint image or the right-eye viewpoint image after the image adjustment processing in a manner such that this image is capable of being observed with a right eye.

BRIEF DESCRIPTION OF DRAWINGS

FIG. 2A illustrates, with reference to a typical trigonometrical survey, a ranging process based on images resulting from pencils of light passing through two pupil-plane regions located at different positions on an objective depicted in FIG. 1 (example 1);

FIG. 2B illustrates, with reference to a typical trigonometrical survey, a ranging process based on images resulting from pencils of light passing through two pupil-plane regions located at different positions on an objective depicted in FIG. 1 (example 2);

DESCRIPTION OF EMBODIMENTS

Figure 1:
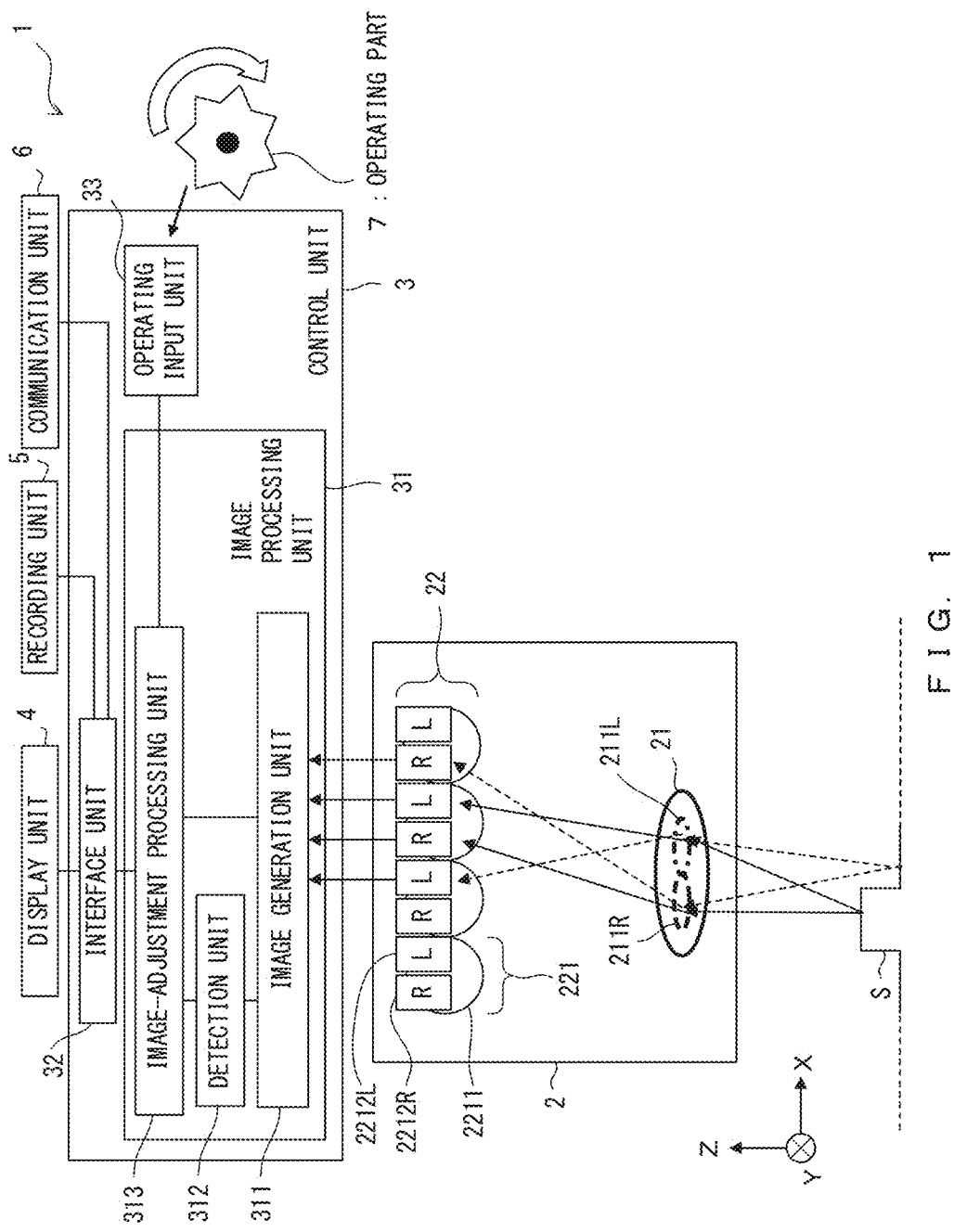
FIG. 1 illustrates an example of the configuration of a microscope system that includes an image processing apparatus in accordance with an embodiment.

The apparatus disclosed in patent document 1 is required to be provided with a large-diameter optical system and is thus difficult to be miniaturized. This apparatus could provide a three-dimensionality different from that of an actual subject depending on the distance to the subject. For example, when a distance to a subject, e.g., the distance from a sample to an objective when performing a microscopic observation, is extremely short, the apparatus disclosed in document 1 could achieve a sense of depth that is greater than the real sense of depth provided by uneven spots on the subject.

In view of the situations described above, embodiments described in the following provide an image processing apparatus, image processing method, and image processing program for allowing the apparatus to be miniaturized and allowing three-dimensionality to be adjusted.

The following describes embodiments by referring to the drawings.

FIG. 1 illustrates an example of the configuration of a microscope system that includes an image processing apparatus in accordance with an embodiment.

As depicted in FIG. 1, a microscope system 1 includes an imaging unit 2, a control unit 3, a display unit 4, a recording unit 5, a communication unit 6, and an operating part 7.

The imaging unit 2 includes an objective 21 and an image sensor 22.

The image sensor 22 includes a plurality of pixel units 221 two-dimensionally arranged in X and Y directions. The pixel units 221 each include one microlens 2211 and two photoelectric conversion elements 2212R and 2212L. The two photoelectric conversion elements 2212R and 2212L of each pixel unit 221 are arranged in the X direction. Note that FIG. 1 depicts only some of the pixel units 221 for the sake of description.

The imaging unit 2 is such that light from a sample S that has passed through the objective 21 is incident on the image sensor 22. More specifically, light from the sample S that has passed through a pupil-plane region 211R within the pupil plane of the objective 21 is incident on the photoelectric conversion elements 2212R of the individual pixel units 221 after the light paths of the light are limited by the microlenses 2211. Light from the sample S that has passed through a pupil-plane region 211L within the pupil plane of the objective 21 is incident on the photoelectric conversion elements 2212L of the individual pixel units 221 after the light paths of the light are limited by the microlenses 2211. Owing to this configuration, light from the sample S that travels on light paths eccentric with respect to the optical axis of the objective 21 can be observed. Note that FIG. 1 and FIGS. 2A, 2B, 3A, and 3B which will be described hereinafter each schematically depict the pupil-plane region 211R and the pupil-plane region 211L like a lens that includes the pupil plane of the pupil-plane region 211R and a lens that includes the pupil plane of the pupil-plane region 211L.

Each pixel unit 221 is such that the photoelectric conversion element 2212R converts incident light into an electric signal and outputs this electric signal as a pixel signal R and the photoelectric conversion element 2212L converts incident light into an electric signal and outputs this electric signal as a pixel signal L. The output pixel signals R and L undergo predetermined signal processing such as A/D conversion processing within the imaging unit 2 and are output to the control unit 3 as pixel data R and pixel data L.

The control unit 3 controls the operation of the entirety of the microscope system 1.

The control unit 3 includes an image processing unit 31, an interface unit 32, and an operating input unit 33.

The image processing unit 31 includes an image generation unit 311, a detection unit 312, and an image-adjustment processing unit 313.

The image generation unit 311 acquires a plurality of pieces of pixel data L and a plurality of pieces of pixel data R output from the imaging unit 2 and generates a left-eye viewpoint image based on the plurality of pieces of pixel data L and a right-eye viewpoint image based on the plurality of pieces of pixel data R. The plurality of pieces of pixel data L correspond to the image information from which a left-eye viewpoint image is capable of being formed. The plurality of pieces of pixel data R correspond to the image information from which a right-eye viewpoint image is capable of being formed.

The detection unit 312 detects, for the left-eye and right-eye viewpoint images generated by the image generation unit 311, one or more pairs that are each a pair of a partial image of the left-eye viewpoint image and a partial image of the right-eye viewpoint image that are similar to each other. For example, this detection process may involve segmenting one of the left-eye and right-eye viewpoint images into a plurality of blocks and retrieving, from the other image, partial images similar to those of these blocks. The "similar" means, for example, that the similarity between images is equal to or greater than a predetermined threshold.

The image-adjustment processing unit 313 performs, for each of the one or more pairs detected by the detection unit 312, image adjustment processing for adjusting the three-dimensionality of one of or both of the partial images of the left-eye and right-eye viewpoint images. In this embodiment, for each of the one or more of the pairs determined on the basis of the positional relationship between partial images of the left-eye and right-eye viewpoint images that belong to each of the pairs detected by the detection unit 312, the image adjustment processing is performed for one of or both of the partial images of the left-eye and right-eye viewpoint images. Details of this will be described hereinafter by referring to FIGS. 2A, 2B, 3A, 3B, and 4. For example, the image adjustment processing may be image deformation processing or image deformation processing and image interpolation processing. The image deformation processing involves, for example, enlarging or moving images or pixels. The image interpolation processing involves, for example, interpolating images or pixels into portions that have lost or is lacking image information due to image deformation processing. The image interpolation processing is such that images or pixels are interpolated by means of other images or pixels located in the vicinity of an interpolation-target region, i.e., a portion that has lost or is lacking image information, and/or by means of an image among the left-eye and right-eye viewpoint images that does not include the interpolation-target region. For example, when the image interpolation processing is performed for a partial image of a left-eye viewpoint image, a right-eye viewpoint image may be used as the above-described image among the left-eye and right-eye viewpoint images that does not include the interpolation-target region.

The image-adjustment processing unit 313 can perform the image adjustment processing in accordance with a three-dimensionality adjustment level that depends on a designation signal input from the operating input unit 33 in response to an operation performed on the operating part 7. In this case, by operating the operating part 7, a user may arbitrarily adjust three-dimensionality to be achieved.

For example, the image processing unit 31 may include a circuit such as an application specific integrated circuit (ASIC) or a field-programmable gate array (FPGA).

The interface unit 32 is an interface that transmits/receives data to/from the display unit 4, the recording unit 5, and the communication unit 6. For example, the interface unit 32 may output a left-eye viewpoint image or a left-eye viewpoint image after the image adjustment processing and a right-eye viewpoint image or a right-eye viewpoint image after the image adjustment processing that have been obtained by the image processing unit 31 to at least one of the display unit 4, the recording unit 5, and the communication unit 6. However, when being output to at least one of the recording unit 5 and the communication unit 6, the left-eye viewpoint image or the left-eye viewpoint image after the image adjustment processing and the right-eye viewpoint image or the right-eye viewpoint image after the image adjustment processing are converted into one image file before being output.

The operating input unit 33 is an input interface that inputs, in accordance with an operation performed on the operating part 7, a designation signal for designating a three-dimensionality adjustment level to the image-adjustment processing unit 313.

The display unit 4 is a display apparatus that displays a left-eye viewpoint image or left-eye viewpoint image after the image adjustment processing that is input thereto via the interface unit 32 in a manner such that this image can be observed with the left eye and displays a right-eye viewpoint image or right-eye viewpoint image after the image adjustment processing that is input thereto via the interface unit 32 in a manner such that this image can be observed with the right eye. For example, the display unit 4 may include a left-eye liquid crystal display (LCD) for displaying a left-eye viewpoint image or a left-eye viewpoint image after the image adjustment processing and a right-eye LCD for displaying a right-eye viewpoint image or a right-eye viewpoint image after the image adjustment processing and may be configured to allow the image displayed on the left-eye LCD to be observed with the left eye and allow the image displayed on the right-eye LCD to be observed with the right eye. In this case, the display unit 4 is shaped like an eyepiece of a binocular microscope.

The recording unit 5 is a recording apparatus such as a hard disk drive. For example, the recording unit 5 may record a left-eye viewpoint image or left-eye viewpoint image after the image adjustment processing and a right-eye viewpoint image or right-eye viewpoint image after the image adjustment processing that have been converted into one image file and input thereto via the interface unit 32.

The communication unit 6 is a communication apparatus that communicates with an external apparatus wirelessly or by a wired link. For example, the communication unit 6 may transmit, to the external apparatus, a left-eye viewpoint image or left-eye viewpoint image after the image adjustment processing and a right-eye viewpoint image or right-eye viewpoint image after the image adjustment processing that have been converted into one image file and input thereto via the interface unit 32.

The operating part 7 is an operating mechanism for designating a three-dimensionality adjustment level for the image-adjustment processing unit 313 and is, for example, a rotating handle.

The following describes details of the image adjustment processing performed by the image-adjustment processing unit 313 by referring to FIGS. 2A, 2B, 3A, 3B, and 4.

FIGS. 2A and 2B each illustrate, with reference to a typical trigonometrical survey, a ranging process based on images resulting from pencils of light passing through the two pupil-plane regions 211L and 211R located at different positions on the objective 21 depicted in FIG. 1.

These figures also schematically depict examples of light rays originating from different observed points on a sample S, then passing through the pupil-plane regions 211R and 211L of the objective 21, and finally incident on photoelectric conversion elements 2212R and 2212L. However, FIGS. 2A and 2B each indicate, for the sake of description, the arrangement of the photoelectric conversion elements 2212R and 2212L in the X direction in conformity with right-eye and left-eye viewpoint images, and this arrangement is different from the real one.

FIG. 2A schematically illustrates examples of light rays originating from an observed point s1 and incident on photoelectric conversion elements 2212R and 2212L. FIG. 2B schematically illustrates examples of light rays originating from an observed point s2 and incident on photoelectric conversion elements 2212R and 2212L.

In FIG. 2A, Xn indicates the distance in the X direction between a photoelectric conversion element 2212R on which a light ray from the observed point s1 that has passed through the center of the pupil-plane region 211R is incident and a photoelectric conversion element 2212L on which a light ray from the observed point s1 that has passed through the center of the pupil-plane region 211L is incident; Px indicates the distance in the X direction between the center of the pupil-plane region 211R and the center of the pupil-plane regions 211L, wherein Px corresponds to parallax; F indicates the distance in the Z direction between the pupil-plane regions 211R and 211L and the photoelectric conversion elements 2212R and 2212L; and Dn indicates the distance in the Z direction between the observed point s1 and the pupil-plane regions 211R and 211L.

In this case, Xn may be determined in accordance with formula (1).

$$Xn=(F+Dn)\times Px/Dn \qquad \text{Formula (1)}$$

In FIG. 2B, Xf indicates the distance in the X direction between a photoelectric conversion element 2212R on which a light ray from the observed point s2 that has passed through the center of the pupil-plane region 211R is incident and a photoelectric conversion element 2212L on which a light ray from the observed point s2 that has passed through the center of the pupil-plane region 211L is incident; and Df indicates the distance in the Z direction between the observed point s2 and the pupil-plane regions 211R and 211L. Note that Df>Dn.

In this case, Xf may be determined in accordance with formula (2).

$$Xf = (F + Dn) \times Px / Df \qquad \text{Formula (2)}$$

FIG. 2B also depicts, for comparison, a light ray originating from a Z-direction position that is the same as the Z-direction position of the observed point s1.

As is clear from Xn and Xf, as a distance D in the Z direction between an observed point and the pupil-plane regions 211R and 211L becomes shorter, a distance X in the X direction between photoelectric conversion elements 2212L and 2212R on which light rays from the observed point are incident becomes longer.

Figures 3A, 3B:
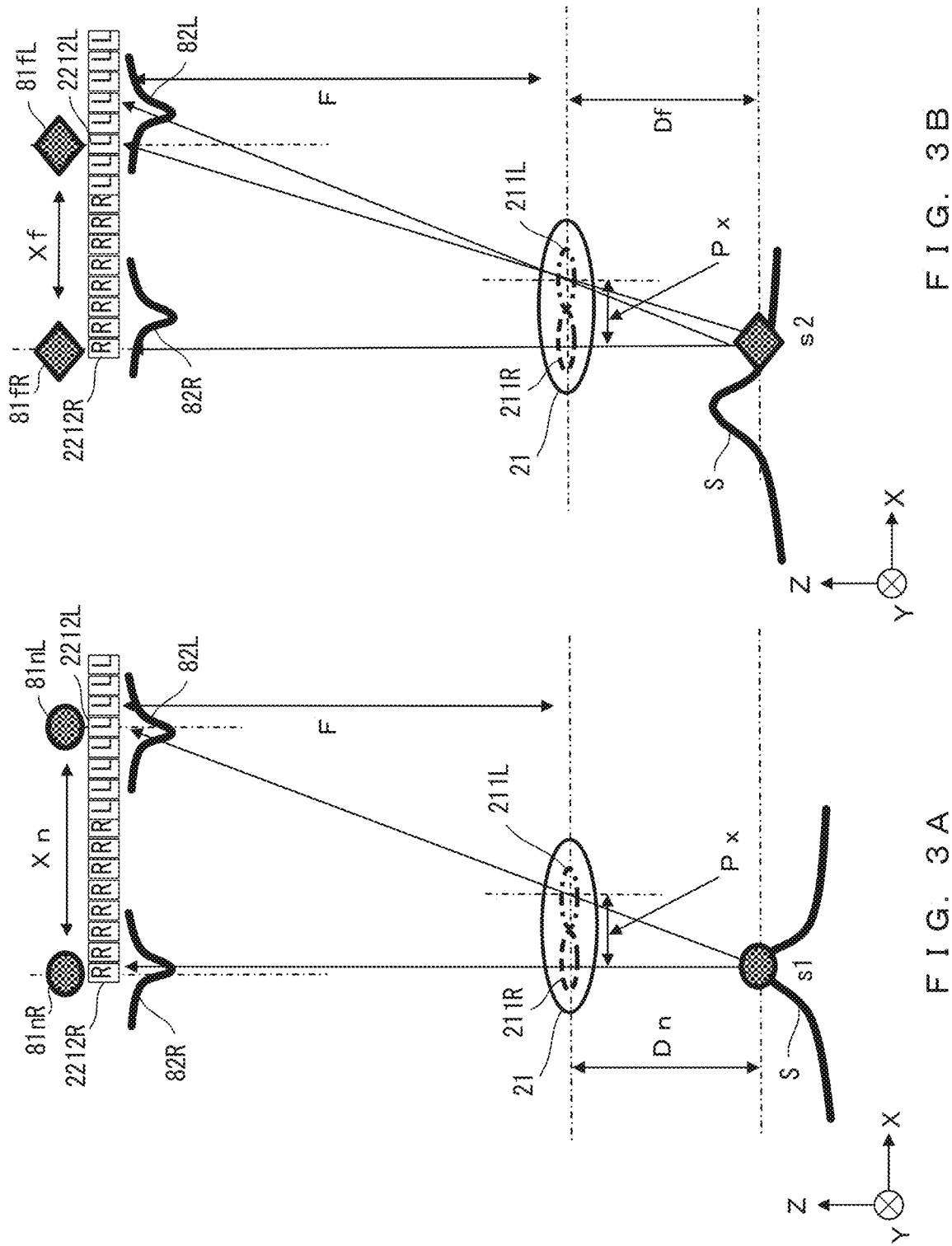
FIG. 3A elaborates on FIG. 2A.
FIG. 3B elaborates on FIG. 2B.

FIGS. 3A and 3B elaborate on FIGS. 2A and 2B. Although the shape of the sample S depicted in FIGS. 3A and 3B is slightly different from that in FIGS. 2A and 2B, this will not hinder the description hereinafter.

FIG. 3A further schematically depicts an image 81 nR based on an electric signal output from a photoelectric conversion element 2212R on which a light ray from the observed point s1 is incident, an image 81 nL based on an electric signal output from a photoelectric conversion element 2212L on which a light ray from the observed point s1 is incident, a signal-level distribution 82R of electric signals output from a plurality of photoelectric conversion elements 2212R, and a signal-level distribution 82L of electric signals output from a plurality of photoelectric conversion elements 2212L.

FIG. 3B further schematically depicts an image 81 fR based on an electric signal output from a photoelectric conversion element 2212R on which a light ray from the observed point s2 is incident, an image 81 fL based on an electric signal output from a photoelectric conversion element 2212L on which a light ray from the observed point s2 is incident, and the distributions 82R and 82L.

As is clear from FIGS. 3A and 3B, as a distance D in the Z direction between an observed point and the pupil-plane regions 211R and 211L becomes shorter, the distance between images based on light rays passing through the pupil-plane regions 211R and 211L becomes longer. This means that as the distance D becomes shorter, a partial image of a left-eye viewpoint image and a partial image of a right-eye viewpoint image that are similar to each other become more distant from each other. Hence, for example, uneven portions of the samples S that include the observed points s1 and s2 may lead to a large change in the positional relationship between similar partial images, with the result that three-dimensionality that should be achieved through the observation of the left-eye and right-eye viewpoint images could be different from the three-dimensionality of the real uneven portions. For example, a sense of depth that is greater than that of the real uneven portions could be achieved.

Accordingly, as will be described hereinafter by referring to FIG. 4, the image-adjustment processing unit 313 performs image adjustment processing for adjusting three-dimensionality to be achieved through the observation of left-eye and right-eye viewpoint images in a manner such that this three-dimensionality becomes close to the three-dimensionality of the real sample S.

Figure 4:
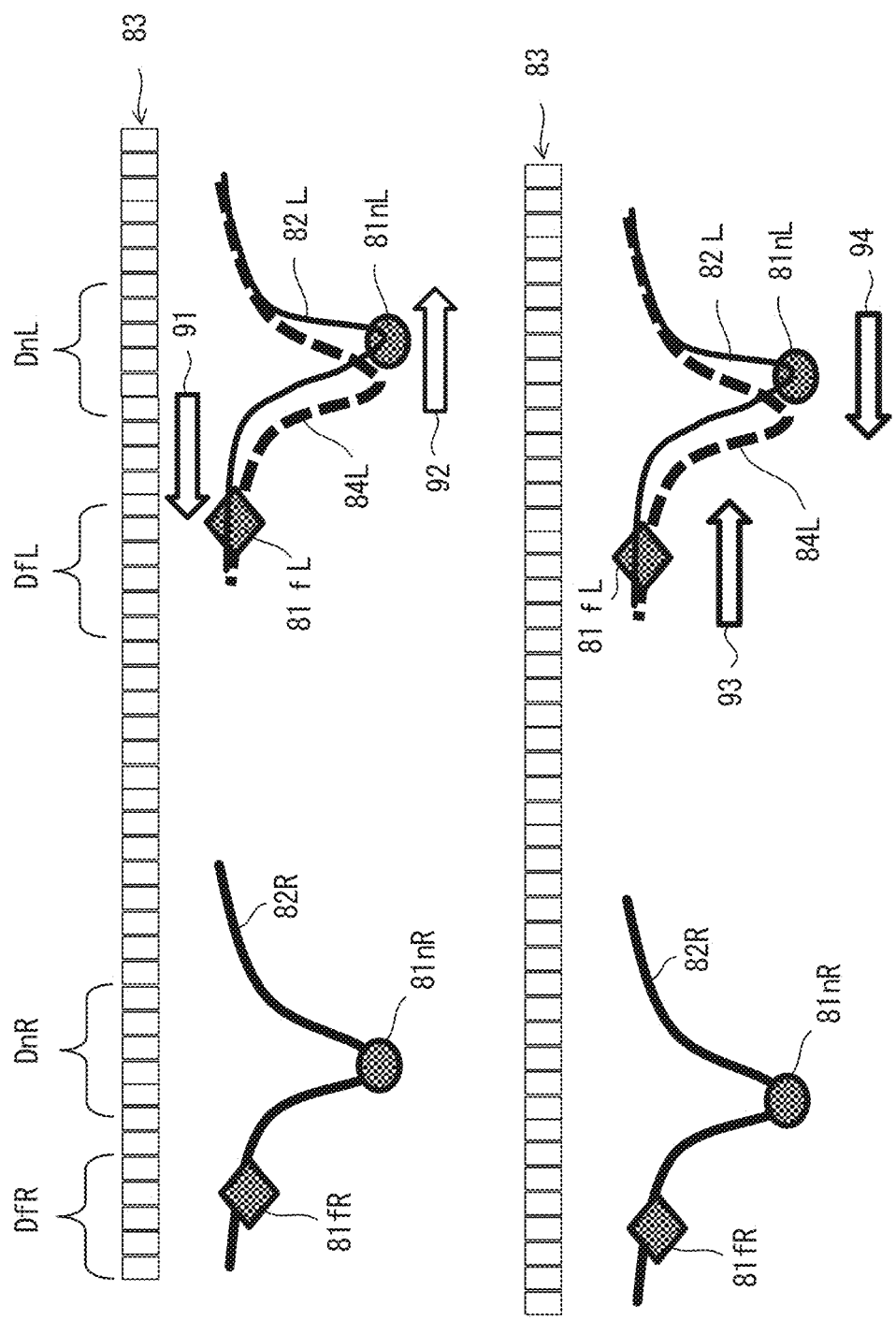
FIG. 4 schematically illustrates an example of image adjustment processing performed by an image adjustment processing unit.

FIG. 4 schematically illustrates an example of the image adjustment processing performed by the image-adjustment processing unit 313.

In FIG. 4, numeral 83 indicates right-eye and left-eye viewpoint images that correspond to photoelectric conversion elements 2212R and 2212L arranged as depicted in FIGS. 3A and 3B. A pair of DfR and DfL and a pair of DnR and DnL each indicate a partial image of the right-eye viewpoint image and a partial image of the left-eye viewpoint image that are similar to each other. DfR is an image that includes 81 fR, DnR is an image that includes 81 nR, DfL is an image that includes 81 fL, and DnL is an image that includes 81 nL.

Assume that according to the positional relationship between partial images belonging to each of a pair of partial images of the right-eye and left-eye viewpoint images that are similar to each other, such as a pair of DfR and DfL and a pair of DnR and DnL, the image-adjustment processing unit 313 has determined, for example, that DfL is excessively close to DfR and DnL is excessively distant from DnR, as indicated by arrows 91 and 92 depicted in FIG. 4.

In this case, for example, the image-adjustment processing unit 313 may apply image adjustment processing such as image deformation processing or image deformation processing and image interpolation processing to DfL and DnL so as to make DfL more distant from DfR and make DnL closer to DnR, as indicated by arrows 93 and 94 in FIG. 4. As a result, the signal-level distribution 82L is deformed into, for example, a distribution such as a distribution 84L indicated by a broken line. In this example, the left-eye viewpoint image is subjected to the image adjustment processing, and the right-eye viewpoint image is not subjected to the image adjustment processing. Hence, an image with three-dimensionality equivalent to that of the real sample S can be viewed by observing the right-eye viewpoint image with the right eye and the left-eye viewpoint image after the image adjustment processing with the left eye.

The following describes processing performed by the microscope system 1.

Figure 5:
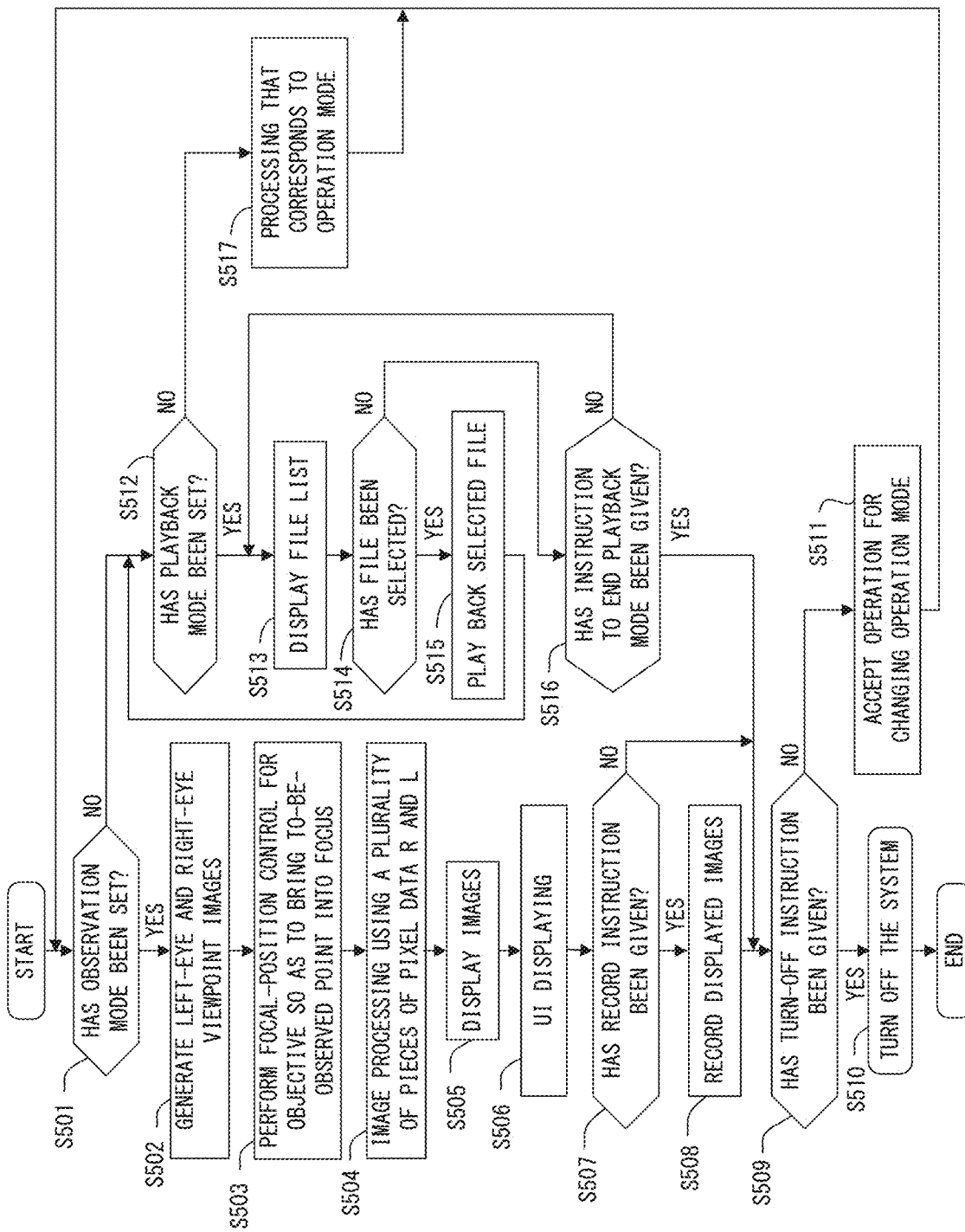
FIG. 5 is a flowchart illustrating the flow of processing performed by a microscope system.
Figure 6:
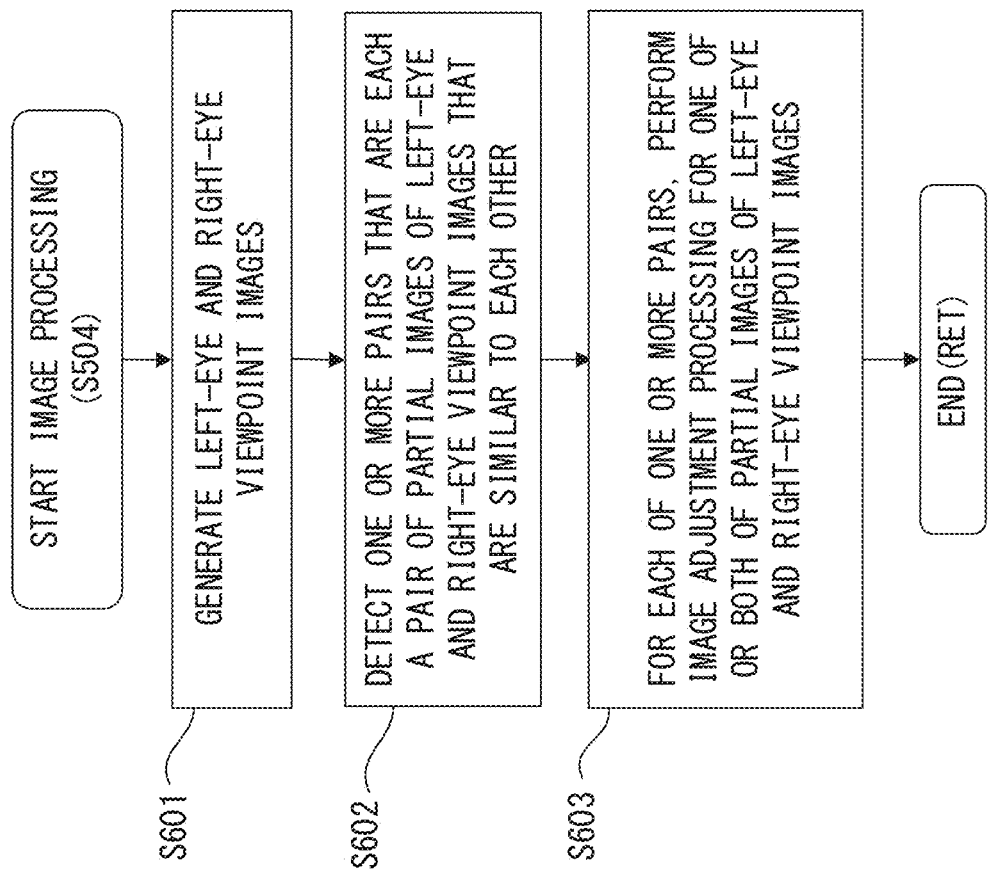
FIG. 6 is a flowchart illustrating the flow of image processing (S504)
Figure 7:
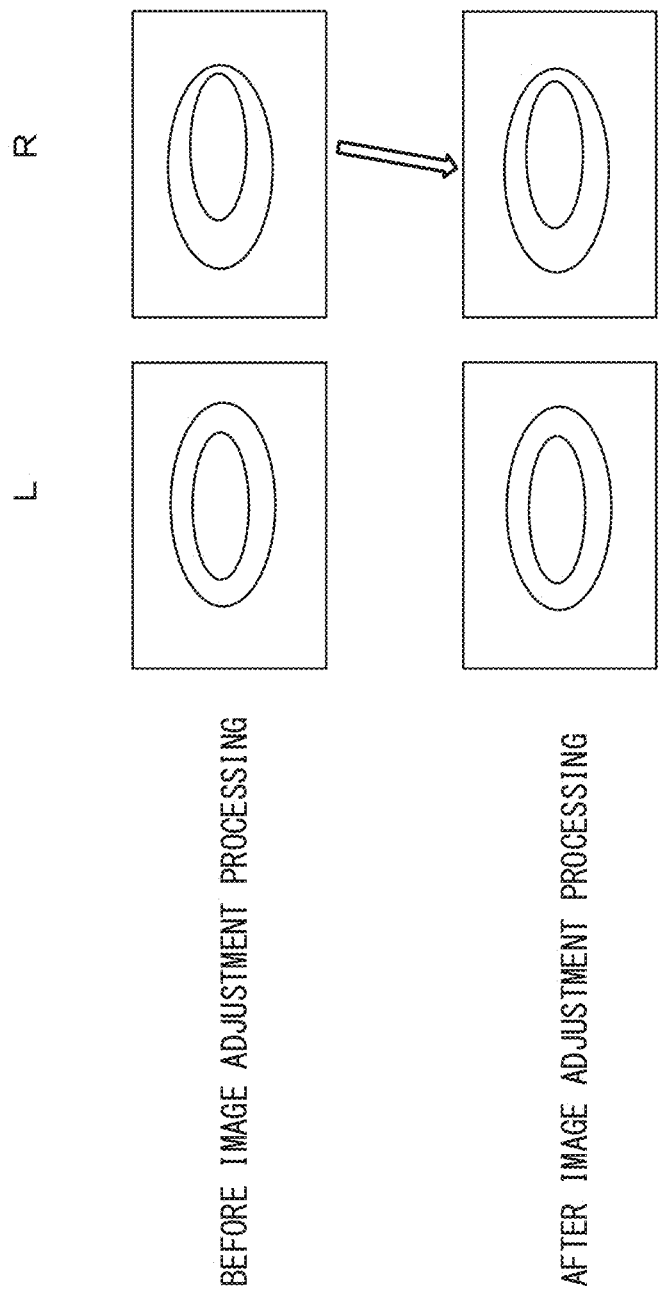
FIG. 7 illustrates an example of images displayed by a display unit (example 1)
Figure 8:
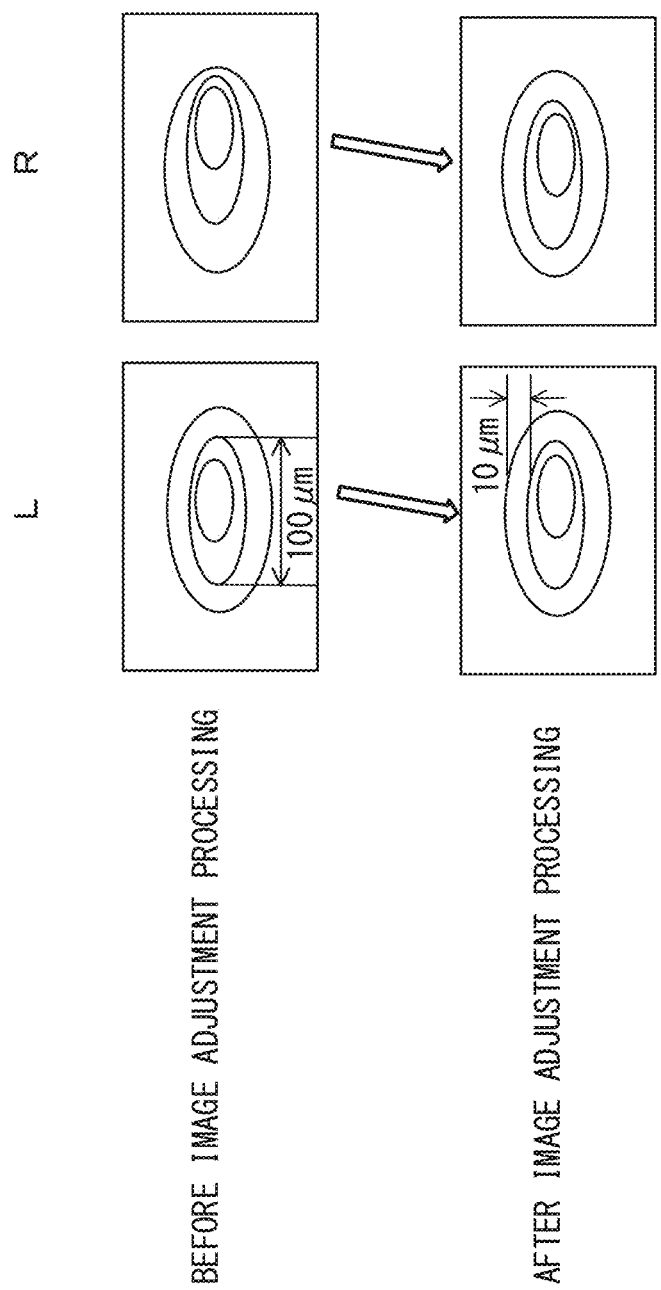
FIG. 8 illustrates an example of images displayed by a display unit (example 2)
Figure 9:
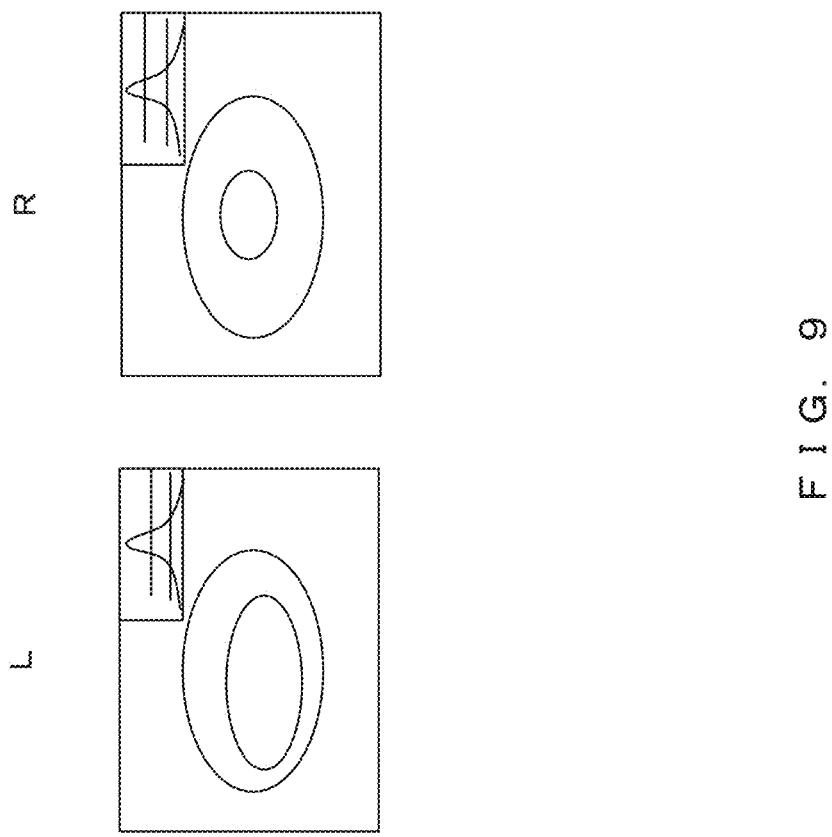
FIG. 9 illustrates an example of images displayed by a display unit (example 3)

FIG. 5 is a flowchart illustrating the flow of processing performed by the microscope system 1. This processing is started when, for example, the microscope system 1 is turned on after a sample S is set on the microscope system 1. FIG. 6 is a flowchart illustrating the flow of image processing (S504). FIGS. 7, 8, and 9 illustrate examples of images displayed by the display unit 4.

When the processing is started, the control unit 3 determines in S501 whether the operation mode is an observation mode, as depicted in FIG. 5. In the initial setting, the observation mode is set as the operation mode.

When the determination result of S501 is YES, the image generation unit 311 generates in S502 a left-eye viewpoint image and right-eye viewpoint image of the sample S by using a plurality of pieces of pixel data L and a plurality of pieces of pixel data R output from the imaging unit 2.

In S503, the control unit 3 performs focal-position control for the objective 21 on the basis of the left-eye and right-eye viewpoint images generated in S502 so as to bring a to-be-observed point on the sample S into focus. The focal-position control is directed to a focus adjustment based on what is called an image-plane phase-detection autofocus (AF) scheme.

In S504, the image processing unit 31 performs image processing for generating a left-eye viewpoint image or a left-eye viewpoint image after the image adjustment processing and a right-eye viewpoint image or a right-eye viewpoint image after the image adjustment processing by using a plurality of pieces of pixel data L and a plurality of pieces of pixel data R output from the imaging unit 2 after the focal-position control of the objective 21 is finished. The following describes details of this processing by referring to FIG. 6.

As depicted in FIG. 6, the image processing (S504) is such that in S601, the image generation unit 311 generates in S502 a left-eye viewpoint image and right-eye viewpoint image of the sample S by using the plurality of pieces of pixel data L and pixel data R output from the imaging unit 2.

In S602, the detection unit 312 detects, for each of the left-eye and right-eye viewpoint images generated by the image generation unit 311 in S601, one or more pairs that are each a pair of a partial image of the left-eye viewpoint image and a partial image of the right-eye viewpoint image that are similar to each other.

In S603, for each of the one or more of the pairs determined on the basis of the positional relationship between partial images of the left-eye and right-eye viewpoint images that belong to each of the pairs detected by the detection unit 312 in S602, the image-adjustment processing unit 313 performs image adjustment processing for adjusting the three-dimensionality of one of or both of the partial images of the left-eye and right-eye viewpoint images.

When S603 is finished, the processing depicted in FIG. 6, i.e., S504 in FIG. 5, ends.

When S504 is finished, the display unit 4, in S505 under the control of the control unit 3, displays the right-eye viewpoint image or right-eye viewpoint image after the image adjustment processing that has been generated in S504 in a manner such that this image can be observed with the right eye and displays the left-eye viewpoint image or left-eye viewpoint image after the image adjustment processing that has been generated in S504 in a manner such that this image can be observed with the left eye.

In S506, the display unit 4 performs user-interface displaying (hereinafter referred to as "UI displaying") on the displayed right-eye viewpoint image or right-eye viewpoint image after the image adjustment processing and the displayed left-eye viewpoint image or left-eye viewpoint image after the image adjustment processing. The UI displaying means displaying an auxiliary image for facilitating identification of the size or shape of the sample S, e.g., displaying contour lines, across section of a sample, or scales. The UI displaying may be an example of an indicator of a sense of depth.

FIGS. 7, 8, and 9 illustrate examples of images displayed by the display unit 4 with the UI displaying performed.

FIG. 7 indicates an example in which contour lines are displayed by the UI displaying. FIG. 8 indicates an example in which contour lines and scales are displayed by the UI displaying. FIGS. 7 and 8 each depict, for comparison, left-eye and right-eye viewpoint images before image adjustment processing on the upper side thereof and the left-eye and right-eye viewpoint images after image adjustment processing on the lower side thereof. However, in the example of FIG. 7, only the right-eye viewpoint image (R) is subjected to image adjustment processing as indicated by the arrow, and in the example of FIG. 8, both the left-eye viewpoint image (L) and the right-eye viewpoint image (R) are subjected to image adjustment processing as indicated by the arrows. FIG. 9 indicates an example in which contour lines and cross sections of the sample are displayed by the UI displaying.

After S506 in FIG. 5, the control unit 3 determines in S507 whether a record instruction directed to the images displayed by the display unit 4 has been given. For example, the record instruction may be given in response to an operation performed on an operating part (not illustrated) different from the operating part 7.

When the determination result in S507 is YES, the control unit 3, in S508, converts the images displayed by the display unit 4 into one image file and records this image file in the recording unit 5. The images converted into a file in this example at least include the right-eye viewpoint image or right-eye viewpoint image after image adjustment processing and the left-eye viewpoint image or left-eye viewpoint image after image adjustment processing that have been displayed by the display unit 4 and may further include an image to be provided for the UI displaying. After S508, the flow shifts to S509.

When the determination result in S507 is NO, the flow shifts to S509.

In S509, the control unit 3 determines whether a turn-off instruction directed to the microscope system 1 has been given. For example, the turn-off instruction may be given in response to an operation performed on an operating part (not illustrated) different from the operating part 7.

When the determination result in S509 is YES, the control unit 3 turns off the microscope system 1 in S510, and the processing depicted in FIG. 5 ends.

When the determination result in S509 is NO, the control unit 3 accepts an operation for changing the operation mode in S511. For example, the operation for changing the operation mode may be performed by operating an operating part (not illustrated) different from the operating part 7. After S511, the flow returns to S501.

When the determination result in S501 is NO, the control unit 3 determines in S512 whether the operation mode is a playback mode.

When the determination result in S512 is YES, the control unit 3 displays, in S513, a list of image files recorded by the recording unit 5 on, for example, a display unit (not illustrated) different from the display unit 4.

In S514, the control unit 3 determines whether an image file has been selected from the displayed list of image files. For example, an image file may be selected in response to an operation performed on an operating part (not illustrated) different from the operating part 7.

When the determination result in S514 is YES, the control unit 3, in S515, plays back the selected image file, i.e., causes the display unit 4 to display the selected image file. As a result, images are displayed in the same manner as S505 or S506 on the basis of the selected image file. After S515, the flow returns to S512.

When the determination result in S514 is NO, the control unit 3 determines in S516 whether an instruction to end the playback mode has been given. For example, the instruction to end the playback mode may be given in response to an operation performed on an operating part (not illustrated) different from the operating part 7.

When the determination result in S516 is YES, the flow shifts to S509.

When the determination result in S516 is NO, the flow returns to S513.

When the determination result in S512 is NO, the control unit 3 performs, in S517, processing that corresponds to the operation mode that has been set and then returns to S501.

As described above, the present embodiment is such that left-eye and right-eye viewpoint images of the sample S are generated, one of or both of these images are subjected to the image adjustment processing, and the left-eye viewpoint image or the left-eye viewpoint image after the image adjustment processing is displayed in a manner such that this image can be observed with the left eye while the right-eye viewpoint image or the right-eye viewpoint image after the image adjustment processing is displayed in a manner such that this image can be observed with the right eye, thereby allowing an image with three-dimensionality equivalent to that of the real sample S to be viewed. The three-dimensionality to be achieved can be adjusted through the image adjustment processing, and hence the objective 21 does not need to have a large diameter, with the result that the apparatus can be miniaturized.

Various modifications can be made to the present embodiment.

In the image processing in S504 in FIG. 5, for example, the image-adjustment processing unit 313 may perform the image adjustment processing in accordance with a three-dimensionality adjustment level that depends on a designation signal input from the operating input unit 33 in response to an operation performed on the operating part 7. In this case, for example, the processing depicted in FIG. 10 may be performed in the image processing (S504) instead of the processing depicted in FIG. 6.

Figure 10:
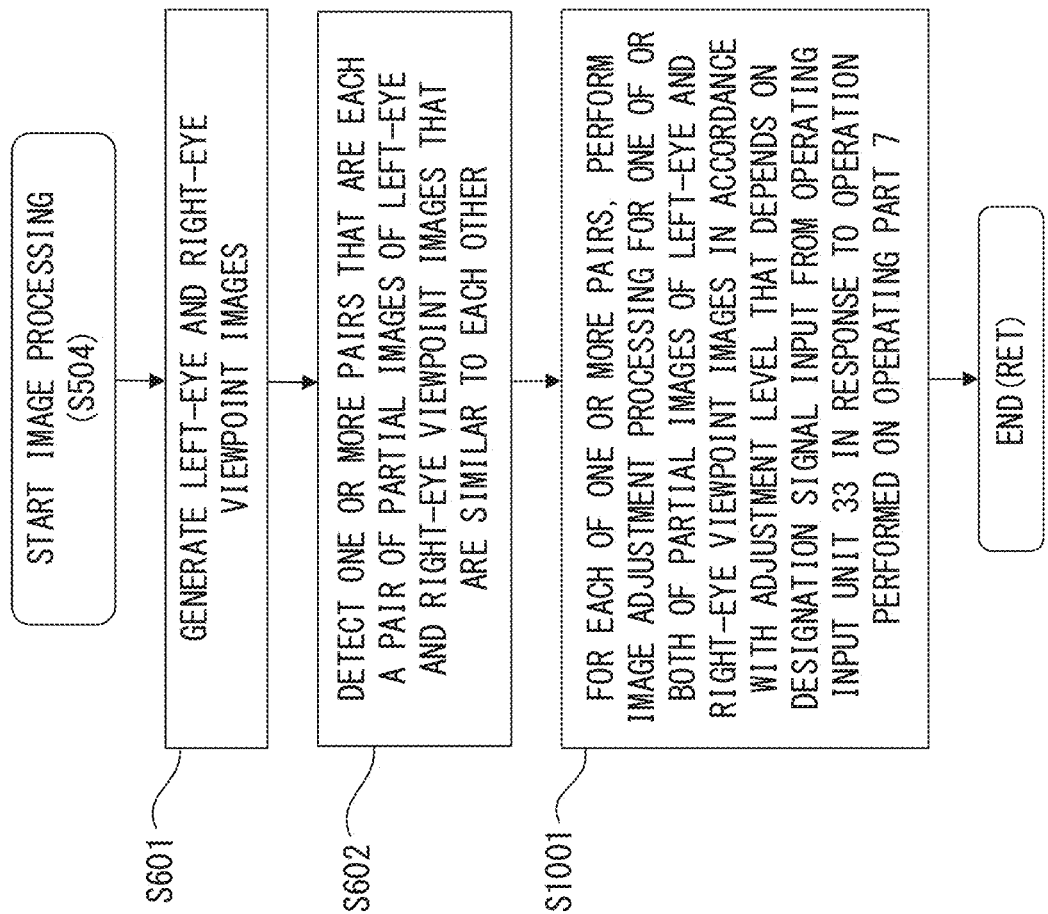
FIG. 10 is a flowchart illustrating the flow of image processing (S504) in accordance with a variation.

FIG. 10 is a flowchart illustrating the flow of the image processing (S504) in accordance with a variation.

As depicted in FIG. 10, the image processing (S504) in accordance with this variation starts with S601 and S602, as in the processing depicted in FIG. 6.

After S602, in S1001, for each of the one or more of the pairs determined on the basis of the positional relationship between partial images of the left-eye and right-eye viewpoint images that belong to each of the pairs detected by the detection unit 312 in S602, the image-adjustment processing unit 313 performs, in accordance with an adjustment level that depends on a designation signal input from the operating input unit 33 in response to an operation performed on the operating part 7, image adjustment processing for adjusting three-dimensionality to be achieved by one of or both of the partial images of the left-eye and right-eye viewpoint images. In this case, the adjustment level may correspond to, for example, the amount of operation performed on the operating part 7.

Accordingly, by operating the operating part 7, the user may arbitrarily adjust three-dimensionality to be achieved.

In the present embodiment, the UI displaying performed in S506 is not limited to those depicted in FIGS. 7, 8, and 9 and may include, for example, displaying a scale or icon for representing a sense of depth.

Figure 11:
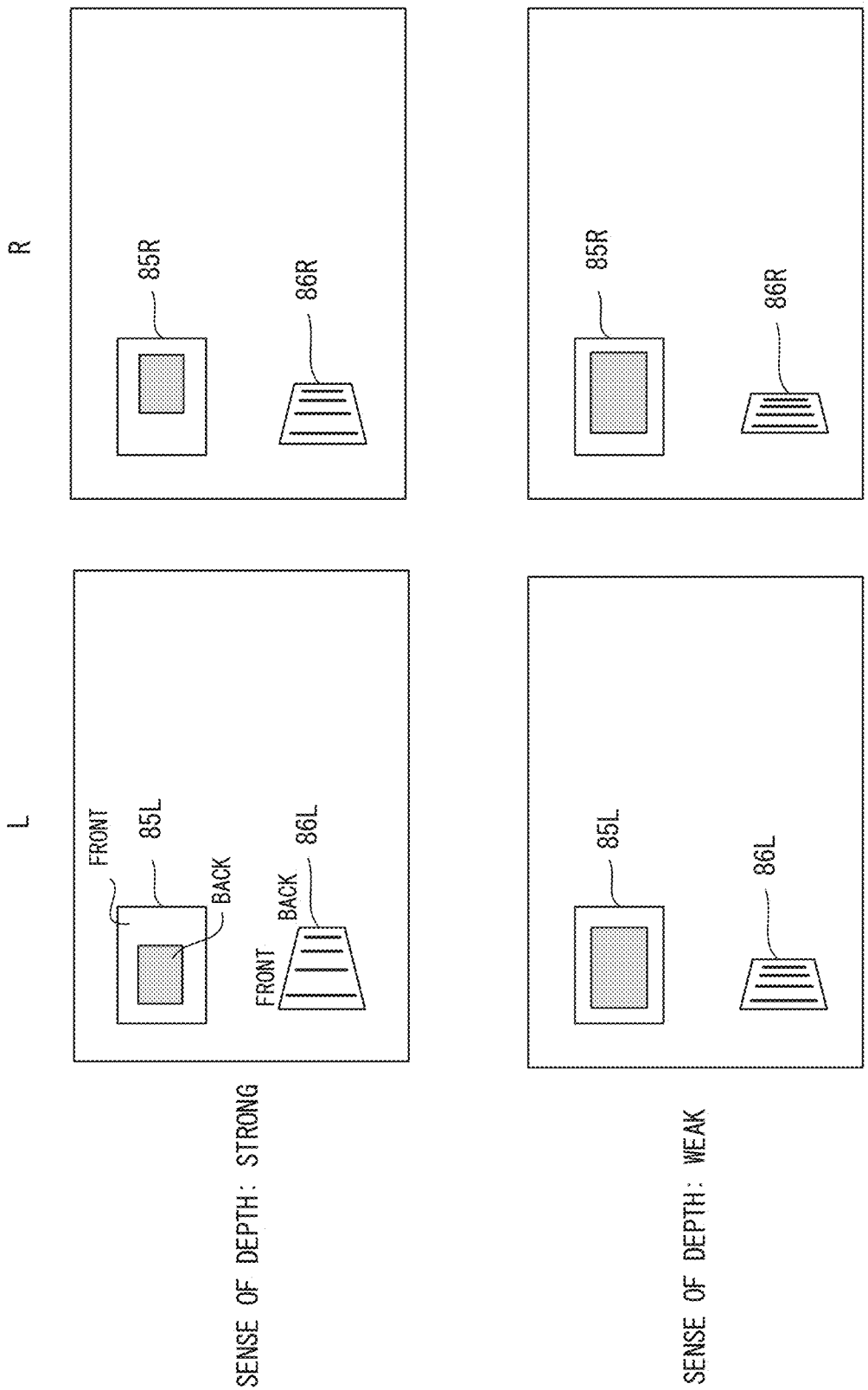
FIG. 11 illustrates examples of UI displaying.

FIG. 11 illustrates examples of UI displaying, wherein right-eye UI displaying (R) and left-eye UI displaying (L) are indicated for each of a strong sense of depth and a weak sense of depth. In this example, the UI displaying includes displaying both an icon and a scale. However, only either of the icon and the scale may be displayed in other embodiments.

In FIG. 11, mark 85L indicates an icon provided by left-eye UI displaying; mark 85R, an icon provided by right-eye UI displaying; mark 86L, a scale provided by left-eye UI displaying; mark 86R, a scale provided by right-eye UI displaying.

As depicted in FIG. 11, the icon 85 and the scale 86 are varied according to the sense of depth. Specifically, an image region of the icon 85 that indicates a back and an image region of the icon 85 that indicates a front are varied according to the sense of depth. The shape of the scale 86 and the intervals between the scale marks in the scale 86 are varied according to the sense of depth. Although FIG. 11 indicates "BACK" and "FRONT" for the sake of description, these words are not actually displayed.

The icons 85 and scales 86 depicted in FIG. 11 allow the user to easily feel the sense of depth.

Figure 12:
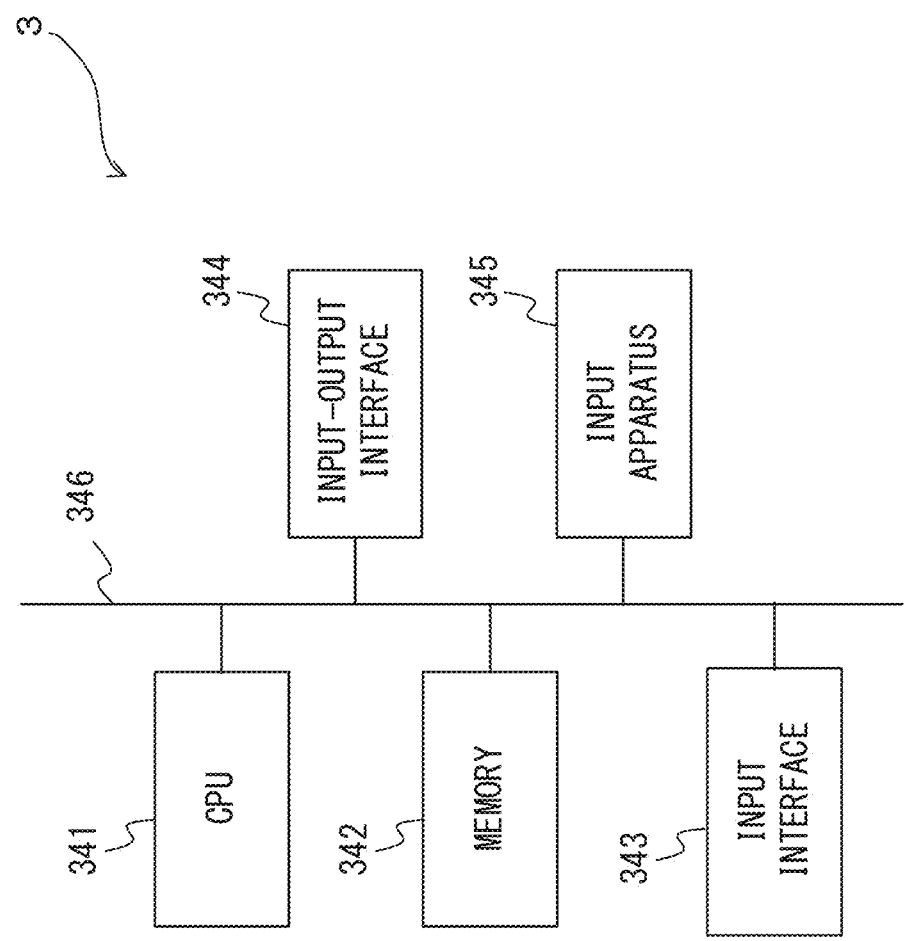
FIG. 12 illustrates an example of the hardware configuration of a control unit.

In the present embodiment, for example, the control unit 3 may be implemented by the hardware configuration depicted in FIG. 12.

FIG. 12 illustrates an example of the hardware configuration of the control unit 3.

As depicted in FIG. 12, the control unit 3 includes a central processing unit (CPU) 341, a memory 342, an input interface 343, an input-output interface 344, and an input apparatus 345, all of which are connected to each other via a bus 346.

The CPU 341 is an operational apparatus that runs a program for processing to be performed by the control unit 3. The memory 342 is, for example, a random access memory (RAM) and a read only memory (ROM), wherein the RAM is used as, for example, a work area for the CPU 341, and the ROM stores, in a nonvolatile manner, a program and information required to execute the program.

The input interface 343 inputs a plurality of pieces of pixel data L and pixel data R output from the imaging unit 2. The input-output interface 344 transmits/receives data to/from the display unit 4, the recording unit 5, and the communication unit 6. The input apparatus 345 inputs, in accordance with an operation performed on the operating part 7, a designation signal for designating a three-dimensionality adjustment level.

Although embodiments have been described above, the invention is not simply limited to those embodiments, and components of the embodiments may be varied in an implementation phase without departing from the gist of the invention, as seen in, for example, the variation described above. A plurality of components disclosed with reference to the described embodiments may be combined, as appropriate, to provide various embodiments. For example, some of the components indicated with reference to an embodiment may be omitted. In addition, components of different embodiments may be combined as appropriate.

What is claimed is:

1. An image processing apparatus comprising:
a processor that performs a process including
acquiring image information from which a left-eye viewpoint image is capable of being formed and image information from which a right-eye viewpoint image is capable of being formed, so as to generate the left-eye and right-eye viewpoint images,
detecting a plurality of pairs that are each a pair of a partial image of the left-eye viewpoint image and a partial image of the right-eye viewpoint image that are similar to each other, and
performing, for each of the plurality of pairs, image adjustment processing for adjusting three-dimensionality of one of or both of the partial images of the left-eye and right-eye viewpoint images;
a display apparatus that displays the left-eye viewpoint image or the left-eye viewpoint image after the image adjustment processing in a manner such that this image is capable of being observed with a left eye, and displays the right-eye viewpoint image or the right-eye viewpoint image after the image adjustment processing in a manner such that this image is capable of being observed with a right eye, and
an image sensor having a plurality of pixel elements, wherein
for each of the plurality of detected pairs determined on the basis of a positional relationship between the partial images of the left-eye and right-eye viewpoint images that belong to the detected pair, the processor performs the image adjustment processing for one of or both of the partial images of the left-eye and right-eye viewpoint images in such a manner that the positional relationship is changed, the plurality of pixel elements each include one microlens and a plurality of photoelectric conversions elements, and the image information from which the left-eye viewpoint image is capable of being formed and the image information from which the right-eye viewpoint image is capable of being formed are acquired from the image sensor.

2. The image processing apparatus of claim 1, wherein the processor performs, as the image adjustment processing, image deformation processing or the image deformation processing and image interpolation processing.

3. The image processing apparatus of claim 2, wherein the image interpolation processing is performed by means of images or pixels located in the vicinity of an interpolation-target region and/or by means of an image among the left-eye and right-eye viewpoint images that does not include the interpolation-target region.

4. The image processing apparatus of claim 1, further comprising:

an operating control for designating a three-dimensionality adjustment level, wherein the processor performs the image adjustment processing in accordance with the adjustment level that depends on an operation performed on the operating mechanism.

5. The image processing apparatus of claim 1, wherein the display apparatus displays a left-eye indicator serving as an indicator of a sense of depth in a manner such that the left-eye indicator is capable of being observed with the left eye and displays a right-eye indicator serving as an indicator of the sense of depth in a manner such that the right-eye indicator is capable of being observed with the right eye.

6. An image processing method to be implemented by an image processing apparatus, the image processing method comprising:

acquiring image information from which a left-eye viewpoint image is capable of being formed and image information from which a right-eye viewpoint image is capable of being formed, so as to generate the left-eye and right-eye viewpoint images;

detecting a plurality of pairs that are each a pair of a partial image of the left-eye viewpoint image and a partial image of the right-eye viewpoint image that are similar to each other;

performing, for each of the plurality of pairs, image adjustment processing for adjusting three-dimensionality of one of or both of the partial images of the left-eye and right-eye viewpoint images;

displaying the left-eye viewpoint image or the left-eye viewpoint image after the image adjustment processing in a manner such that this image is capable of being observed with a left eye, and displaying the right-eye viewpoint image or the right-eye viewpoint image after the image adjustment processing in a manner such that this image is capable of being observed with a right eye;

performing the image adjustment processing for one of or both of the partial images of the left-eye and right-eye viewpoint images in such a manner that the positional relationship is changed for each of the plurality of detected pairs determined on the basis of a positional relationship between the partial images of the left-eye and right-eye viewpoint images that belong to the detected pair;

providing an image sensor having a plurality of pixel elements, the plurality of pixel elements each include one microlens and a plurality of photoelectric conversions elements; and acquiring the image information from which the left-eye viewpoint image is capable of being formed and the image information from which the right-eye viewpoint image is capable of being formed from the image sensor.

7. A non-transitory computer-readable recording medium having recorded therein an image processing program for causing a computer of an image processing apparatus to perform a process comprising:

acquiring image information from which a left-eye viewpoint image is capable of being formed and image information from which a right-eye viewpoint image is capable of being formed, so as to generate the left-eye and right-eye viewpoint images;

detecting a plurality of pairs that are each a pair of a partial image of the left-eye viewpoint image and a partial image of the right-eye viewpoint image that are similar to each other;

performing, for each of the plurality of pairs, image adjustment processing for adjusting three-dimensionality of one of or both of the partial images of the left-eye and right-eye viewpoint images;

displaying the left-eye viewpoint image or the left-eye viewpoint image after the image adjustment processing in a manner such that this image is capable of being observed with a left eye, and displaying the right-eye viewpoint image or the right-eye viewpoint image after the image adjustment processing in a manner such that this image is capable of being observed with a right eye;

performing the image adjustment processing for one of or both of the partial images of the left-eye and right-eye viewpoint images in such a manner that the positional relationship is changed for each of the plurality of detected pairs determined on the basis of a positional relationship between the partial images of the left-eye and right-eye viewpoint images that belong to the detected pair;

providing an image sensor having a plurality of pixel elements, the plurality of pixel elements each include one microlens and a plurality of photoelectric conversions elements; and acquiring the image information from which the left-eye viewpoint image is capable of being formed and the image information from which the right-eye viewpoint image is capable of being formed from the image sensor.

8. The image processing apparatus of claim 1, wherein the processor performs the image adjustment processing in such a manner that the positional relationship is made more distant or made closer.

9. The image processing apparatus of claim 1, wherein the processor compares the positional relationship of each of the plurality of pairs and performs the image adjustment processing in such a manner that the positional relationship is changed based on a comparison result.

* * * * *